M Senior.
Lubricating Device.
Nº 75584.   Patented Mar. 17, 1868.
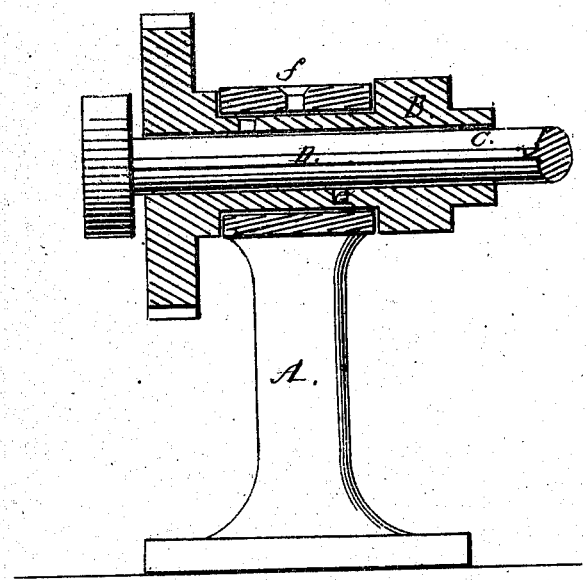
Attest:
W. G. Ashkettle
Wm A. Morgan
Inventor:
M Senior
per Munn & Co
Attorneys

United States Patent Office.

MATHEW SENIOR, OF FRANKFORD, PENNSYLVANIA.

Letters Patent No. 75,584, dated March 17, 1868.

IMPROVEMENT IN LUBRICATING-DEVICE.

The Schedule referred to in these Letters Patent and making part of the same.

TO ALL WHOM IT MAY CONCERN:

Be it known that I, MATHEW SENIOR, of Frankford, in the county of Philadelphia, and State of Pennsylvania, have invented a new and improved Lubricating-Device; and I do hereby declare that the following is a full, clear, and exact description thereof, which will enable those skilled in the art to make and use the same, reference being had to the accompanying drawings forming part of this specification.

This invention relates to a new and useful device for lubricating the feather of a shaft, which has a longitudinal as well as a rotating motion imparted to it, for certain mechanical operations; and it consists in providing means for lubricating the shaft and the feather, as will be hereinafter described.

The drawing represents a vertical section of the arrangement, showing the supporting stand, the revolving tubular journal, and feathered shaft.

A is the stand, B is the tubular-journal, C is the shaft, and D is the feather on the shaft, which works in a groove in the journal. On the end of the shaft is what is called a "rubber," and the drawing is a section of the bearing of the "improved rubber condenser." About fourteen of these feather-shafts are used in one condensing-machine, and the feathers are very liable to wear out, in consequence of the difficulty of properly lubricating them.

The old method of oiling the feather is to pour oil on the feather and shaft outside of the journal, and allow it to work its way towards the centre from each end. This but partially accomplishes the object, as most of the oil drips off without entering the hollow journal, while the oil, which thus drips down, falls on to and smears the machinery below.

By boring oil-holes through the tubular journal B, as seen in the drawing, (e e,) so that the feather receives oil from two sources (or on each side) at each revolution, the object is accomplished, the feather being perfectly lubricated and preserved. The oil is poured into the oil-hole f through the cap g, and entering the holes e e, works from the centre or middle portion of the shaft towards the ends. H is a gear-wheel on the hollow journal B. J is the rubber on the shaft C.

Having thus described my invention, I claim as new, and desire to secure by Letters Patent—

Lubricating the feather D upon the shaft C from each side of said feather, through the holes e e in the tubular journal B, and the hole f in the hollow cap g, as herein described for the purpose specified.

MATHEW SENIOR.

Witnesses:
JNO. A. BRIGGS,
CHAS. W. MORGAN.